US011853641B2

(12) United States Patent
Andersen et al.

(10) Patent No.: US 11,853,641 B2
(45) Date of Patent: Dec. 26, 2023

(54) SYSTEM AND METHOD FOR AUDIO COMBINATION AND PLAYBACK

(71) Applicant: HEARMECHEER, INC., Meaford (CA)

(72) Inventors: Nicholas Andersen, Meaford (CA); Thomas Andersen, Meaford (CA); Elias Andersen, Meaford (CA); Jason Rubenstein, Meaford (CA)

(73) Assignee: HEARMECHEER, INC., Meaford (CA)

( * ) Notice: Subject to any disclaimer, the term of this patent is extended or adjusted under 35 U.S.C. 154(b) by 55 days.

(21) Appl. No.: 17/446,134

(22) Filed: Aug. 26, 2021

(65) Prior Publication Data

US 2022/0113930 A1    Apr. 14, 2022

Related U.S. Application Data

(60) Provisional application No. 63/070,435, filed on Aug. 26, 2020.

(51) Int. Cl.
*G06F 3/16*    (2006.01)

(52) U.S. Cl.
CPC .............. *G06F 3/162* (2013.01); *G06F 3/165* (2013.01); *G06F 3/167* (2013.01)

(58) Field of Classification Search
CPC ........... G06F 3/162; G06F 3/165; G06F 3/167
USPC ....................................................... 715/716
See application file for complete search history.

(56) References Cited

U.S. PATENT DOCUMENTS

| | | | |
|---|---|---|---|
| 8,379,874 B1* | 2/2013 | Simon | H04R 27/00 381/1 |
| 11,179,635 B2* | 11/2021 | Platt | H04S 7/304 |
| 2002/0188943 A1* | 12/2002 | Freeman | H04N 7/17318 348/E7.039 |
| 2006/0104223 A1* | 5/2006 | Glatron | H04J 3/0629 370/516 |
| 2012/0017242 A1* | 1/2012 | Newell | H04N 21/2743 725/38 |
| 2014/0317673 A1* | 10/2014 | Murugan | H04L 12/1895 725/116 |
| 2016/0261917 A1* | 9/2016 | Trollope | H04N 21/42203 |
| 2016/0378427 A1* | 12/2016 | Sharma | G10L 19/0212 700/94 |
| 2017/0170918 A1* | 6/2017 | Nicolino, Jr. | H04W 4/90 |
| 2017/0330579 A1* | 11/2017 | Zhang | H04M 3/002 |
| 2020/0404219 A1* | 12/2020 | Yerli | G06T 19/006 |

OTHER PUBLICATIONS

Huggins, Mark, et al. "Adaptive High Accuracy Approaches to Speech Activity Detection in Noisy and Hostile Audio Environments." Conference of the International Speech Communication Association, Sep. 2010, https://doi.org/10.21437/interspeech.2010-770. (Year: 2010).*

* cited by examiner

*Primary Examiner* — Stephen S Hong
*Assistant Examiner* — Broderick C Anderson
(74) *Attorney, Agent, or Firm* — GRAESER ASSOCIATES INTERNATIONAL INC.; D'vorah Graeser

(57) ABSTRACT

A system and method for audio combination and playback which replicates the sounds made by a crowd gathered together in one place.

12 Claims, 12 Drawing Sheets

High Level User Experience Flow

User stay on as long as they'd like. Typical game durations are between 2-3 hrs.

High Level User Experience Flow

User stay on as long as they'd like. Typical game durations are between 2-3 hrs.

User Interface

Crowd Based Sound Aggregation

Sound Quality: User Input Rejection

Server Cluster Architecture

Personal Audio Feed: Example for User 1

Client Sequence Diagram

Echo Flow Chart

Boxes Feature

SYSTEM AND METHOD FOR AUDIO COMBINATION AND PLAYBACK

FIELD OF THE INVENTION

The present invention is of a system and method for audio combination and playback, and in particular, to such a system and method which replicates the sounds made by a crowd gathered together in one place.

BACKGROUND OF THE INVENTION

Inviting fans of a particular event to join remotely has become increasingly important. Sporting events, for example, sell their television and other remote viewing rights at a high price. Indeed, certain remote viewing events are so lucrative that they require viewers to purchase an individual viewing ticket (pay per view) in order to see them. However, remote viewing may lack the feeling of intimacy and gathering together with a large crowd that is available to those who view the event "live" in the same physical space where it is occurring. Clearly remote viewing of live events would be even more lucrative if remote viewers felt that their viewing experience had these qualities.

BRIEF SUMMARY OF THE INVENTION

The background art does not teach or suggest a method for providing, a similar feeling to remote viewers as for those viewing a live event in the same physical space where it is occurring. The background art does not also teach or suggest a method for audio combination and playback which replicates the sounds made by a crowd gathered together in one place.

The present invention overcomes the background art by providing a system and method for audio combination and playback which replicates the sounds made by a crowd gathered together in one place.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality. Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DESCRIPTION OF AT LEAST SOME EMBODIMENTS

Figure 1:
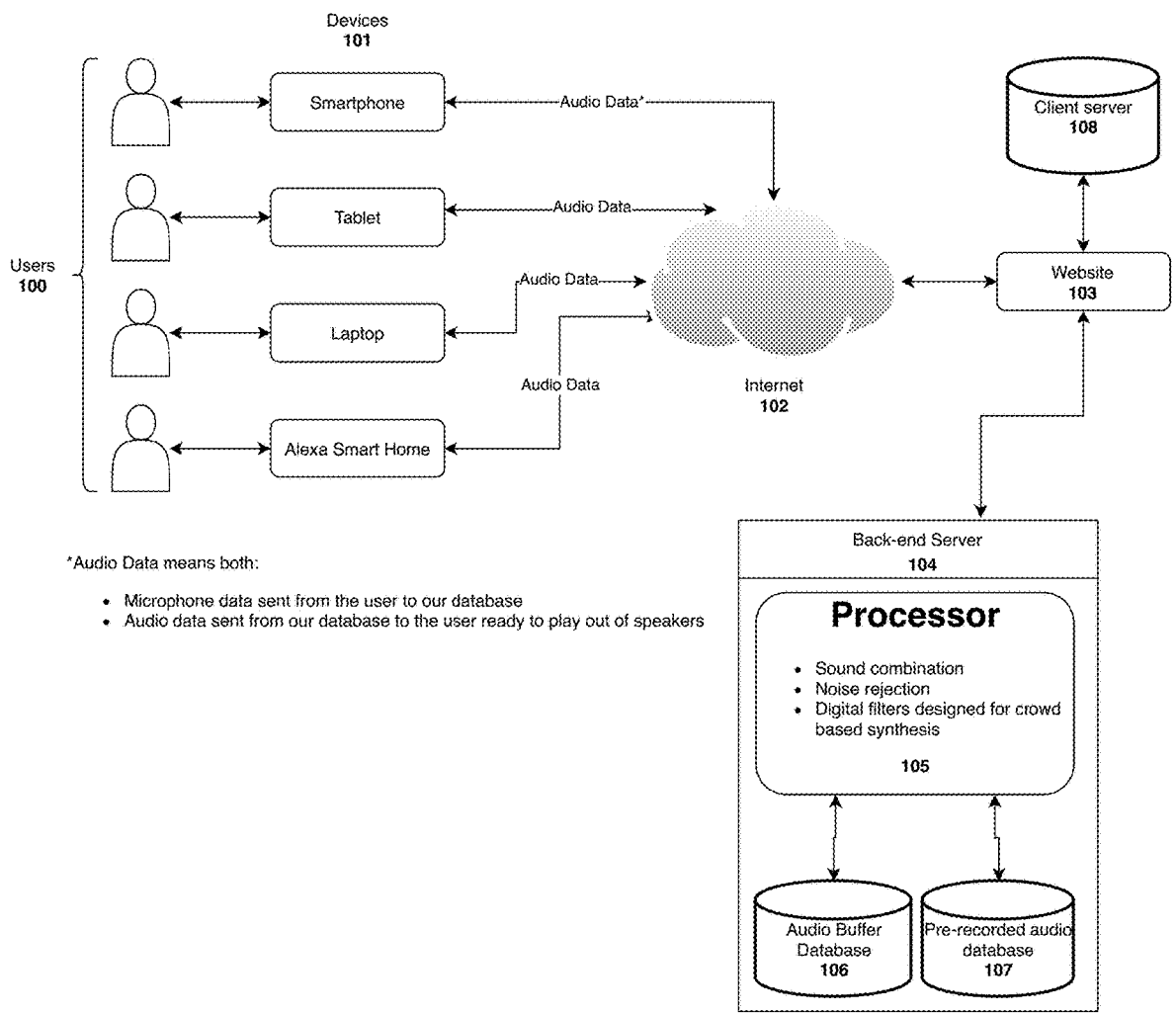
FIG. 1 shows a non-limiting exemplary system for analyzing user input sound, and combining it to form a cheer or other combined sound output.

Turning now to the Figures, FIG. 1 shows a non-limiting exemplary system for analyzing user input sound, and combining it to form a cheer or other combined sound output. As shown in a system, there is provided a plurality of devices 101 that interact with a plurality of users 100. Devices 101 may include but are not limited to a smartphone, tablet, an Alexa or other smart speaker, a smart home appliance, user computer, laptop, a phablet (smartphone having a larger display screen) or indeed any other computational device. Devices 101 connect to a computer network such as the internet 102 by providing audio data through the computer network 102 and also receiving audio data for audio display from the computer network 102. The audio data is then provided through a website 103 which is operated by client server 108, and which may act for example as a gateway or portal. A backend server 104 preferably features a processor 105, an audio buffer database 106 and a pre-recorded audio database 107. Processor 105 preferably combines the sound from the plurality of users, may perform noise rejection or other pre-processing to provide a better sound, and may also feature the application of one or more digital filters in order to create a crowd base synthesized sound. An audio buffer database 106 enables the sounds to be combined in a way that avoids lag or at least reduces time lag. A pre-recorded audio database 107 features sounds that may be combined with those provided by the users through processor 105. For example, and without limitation, pre-recorded audio database 107 may include sounds of other crowd noises, playing of an anthem, performing the wave, in which a variety of users all around a stadium, if they were present in a stadium, would make a sound sequentially which sounds like a wave, and so forth. All of this is then operated by backend server 104 so that the sounds are received by backend server 104, combined, and then output back to website 103 for display on one or more of the plurality of user devices 101.

Figure 2:
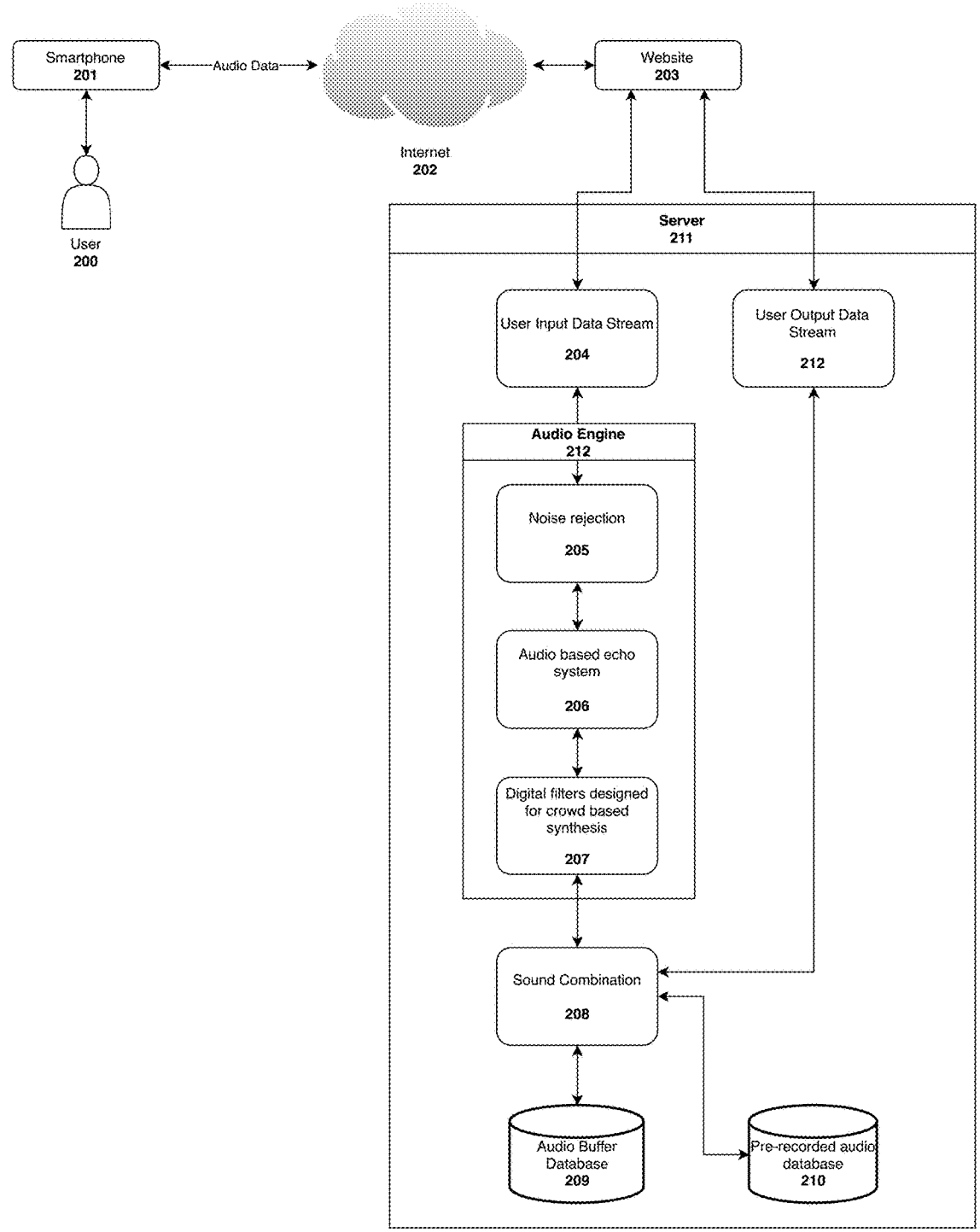
FIG. 2 shows the non-limiting exemplary system diagram concentrating on the previously mentioned server for combining the audio sounds.

FIG. 2 shows the non-limiting exemplary system diagram concentrating on the previously mentioned server for combining the audio sounds. As shown in a system, a user 200 interacts with a device, in this case as an unlimiting example, a smartphone 201. Data is sent from smartphone 201 and is received by smartphone 201 as combined data for audio display to the user. By "audio display" it is meant audio that is to be played back to the user. Such combined audio data preferably sounds like a stadium full of cheering fans optionally with other sounds as previously described. Audio data is conveyed to and from a website 203 which may act as a gateway to a server 211 through a computer network such as the internet 202. Server 211 receives user data through a user input data stream 204 and then analyzes this data through an audio engine 212. Audio engine 212 performs noise rejection 205 or other filters, for example, to prevent sounds from being included which are poor quality, which may involve feedback or which may otherwise not be of an acceptable standard. The noise rejection filter process is described with regard to FIG. 7.

The sound then passes through an audio based echo system 206 in order to reduce echo or alternatively to add echo to provide the sound of a plurality of users cheering in a large stadium or other open area, or alternatively large closed area. A non-limiting example of such an echo system is shown with regard to FIG. 11.

Next, digital filters are applied which are designed for crowd based synthesis at 207. These digital filters preferably enable the sound to be combined in a way so that sounds more like a large number of cheering individuals whether an open field in an open air stadium in a stadium with a roof or in an another large area. The processed user audio data with user audio data is preferably combined from multiple streams optionally with, echo or other sound effects other processing, after which these digital filters are applied. Such a combination may enable the sound to be synthesized to create a more realistic sound. For example, a bandpass or lowpass filter which is designed to cut out unwanted noises can be used.

The sounds are then combined at 208 to provide a combined sound, optionally with data that is buffered through an audio based buffer database 209 which may upgrade the sound quality and/or adjust the sound as previously described, and also optionally by combining sounds from a pre-recorded audio database 210, such as noise of fans in a crowded stadium as previously described. The combined sounds are then output from sound combination 208 back to a user output data stream 212 and then back through website 203 and ultimately to the device of user 200, which in this case is smartphone 201. Smartphone 201 then preferably displays (plays back the audio data, which preferably sounds like a large number of users again in a stadium whether open or closed, in an open or closed air building, or in a field or other large enclosure.

Optionally in one embodiment users can be grouped according to latency and for example, an echo added to those users who are either very fast or very slow by audio based echo system processing at 206.

The result then passes to sound combination at 208, where these sounds are combined and then stored in the audio buffer database at 209, and then may be stored at the pre-recorded audio database at 210. For example, pre-recorded clips can be played back and layered at different times. Thus the live, the buffered, and the pre-recorded datasets can all be put together at the sound combination 208 and then this can be passed directly back up the digital filters and the noise rejection again to reach the user data stream at 204.

Figure 3:
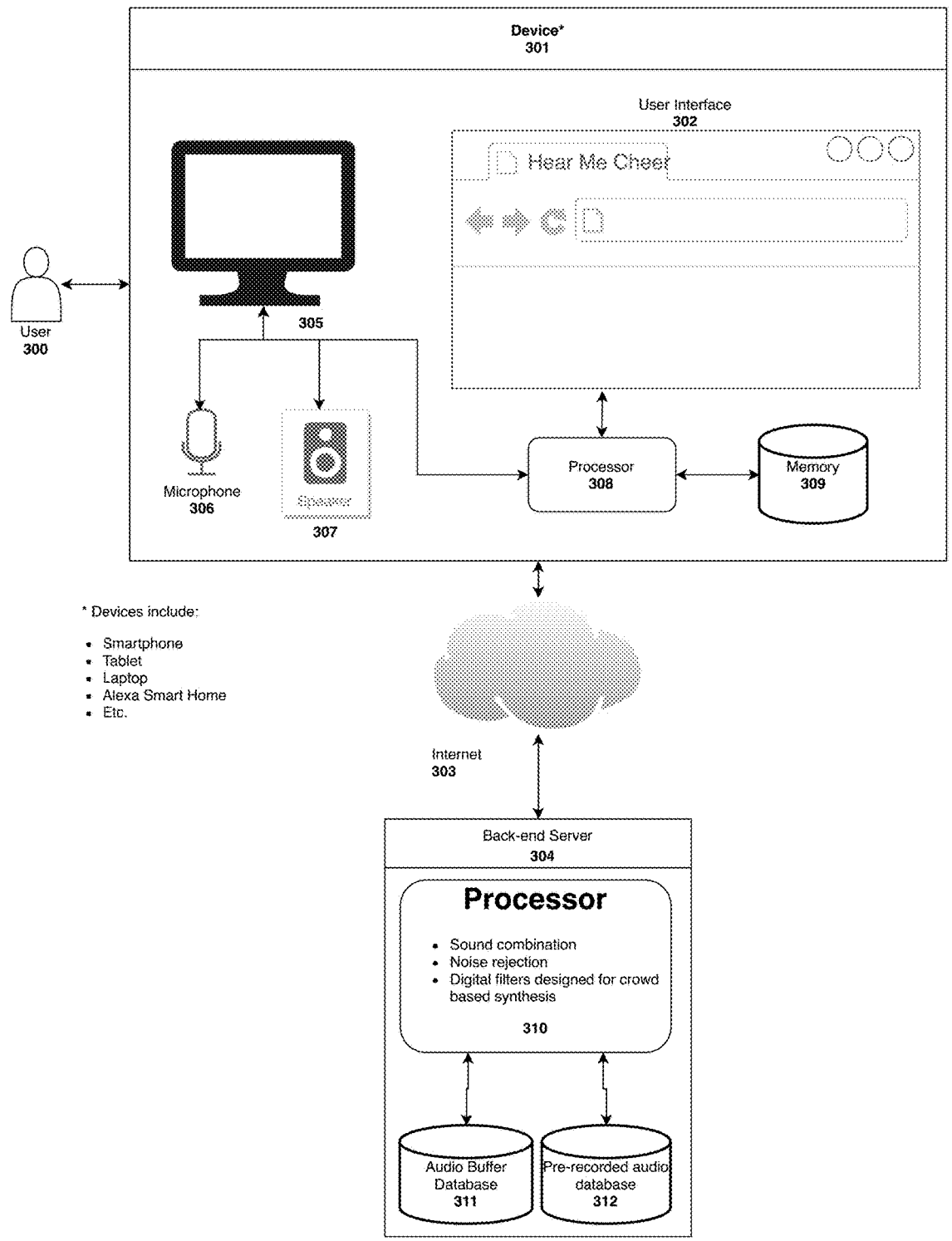
FIG. 3 shows a non-limiting exemplary diagram with regard to the operations of the client, which is operated by the user device.

FIG. 3 shows a non-limiting exemplary diagram with regard to the operations of the client, which is operated by the user device. Again, user 300 is shown operating a device 301, which may optionally be any computational device as previously described. Device 301 features a display 305, which preferably includes a microphone 306 for inputting user audio data, and a speaker 307 for outputting audio data that is combined for display to the user. Data analysis and initial processing may optionally be performed by processor 308 through a user interface 302. User interface 302 preferably enables the audio data to be output by the user as controlled by the user and also allows the user to determine which user audio combined feed should be input. For example, a plurality of different games may have this feature for combined sounds available at one time if the user is watching a particular game, then the user would like to receive audio feeds from that game and not from a different game, for example. A memory 309 stores a plurality of instructions that, upon execution by a processor 308, enables operation of user interface 302 so that the input audio data from microphone 306 is sent for combination with sounds for the correct game or other event, And the output audio data as output through speaker 307 is again obtained from the correct game or other event. Data is sent from a backend server 304 and is also combined audio data from backend server 304 to user device 301 in both cases audio transmission to and from occurs through a computer network such as internet 303. Backend server 304, preferably features a processor 310, which may operate as previously described, for example, for sound combination noise reduction and also application of digital filters. Preferably backend server 304 also features an audio buffer database 311 for operations previously described, for example, to avoid latency and for better combination of user input sound, and may also feature a pre-recorded audio database 312 again for combining pre-recorded sounds to the input user audio data, which may then be output from backend server 304.

Figure 4:
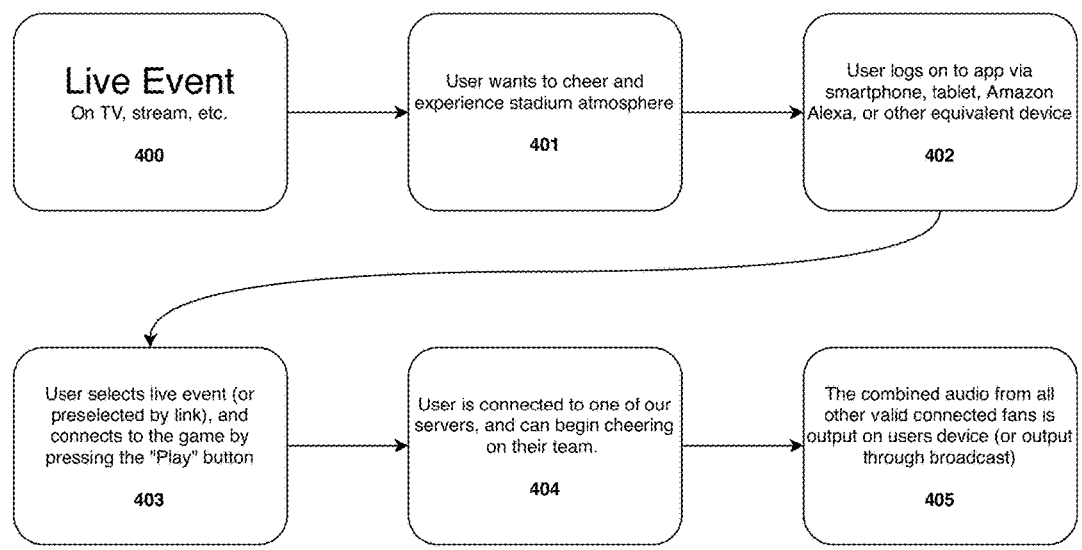
FIG. 4 shows a non-limiting exemplary method for creating a combined user input sound from a plurality of separate user input sounds and then outputting that combined sound to a user device for display.

FIG. 4 shows a non-limiting exemplary method for creating a combined user input sound from a plurality of separate user input sounds and then outputting that combined sound to a user device for display. The process preferably begins with a live event being displayed at 400. The live event may be displayed on TV through streaming or through any other means. The live event may include a game, a musical performance, a theatrical performance, opera, and the like. Any type of live event in which cheering or noise making by an audience member is considered to be acceptable, or even encouraged. At 401 the user decides that they want to cheer and experience the stadium atmosphere and therefore they wish to have the audio output from this game displayed to them and they also want to participate in the audio input for this game. At 402 the user then logs on to the app through some device, including but not limited to a smartphone, tablet, an Alexa or other smart speaker, a smart home appliance, user computer, laptop, a phablet (smartphone having a larger display screen) or indeed any other computational device. At 403, the user selects the live event to connect to the game. The live event may be pre-selected, for example, through an invitation link, for example, optionally, the user may have set up a reminder that they wish to view this event, they may have even bought tickets for a pay per view. If that is the case, then optionally a link is invoked, or some other type of system or function is invoked so that the event is started. The user may be asked to press a play button to start or play may occur automatically. Next at 404, the user is connected to a server so that their audio data is output to the server and they can begin to cheer as multiple users cheer the combined audio from all other valid connected fans is output through a broadcaster user device at 405. The user may optionally stay on for the game as long as is desired or as long as the event is occurring. As an nonlimiting example, a typical sporting event or other game may be between two to three hours in length.

Figure 5:
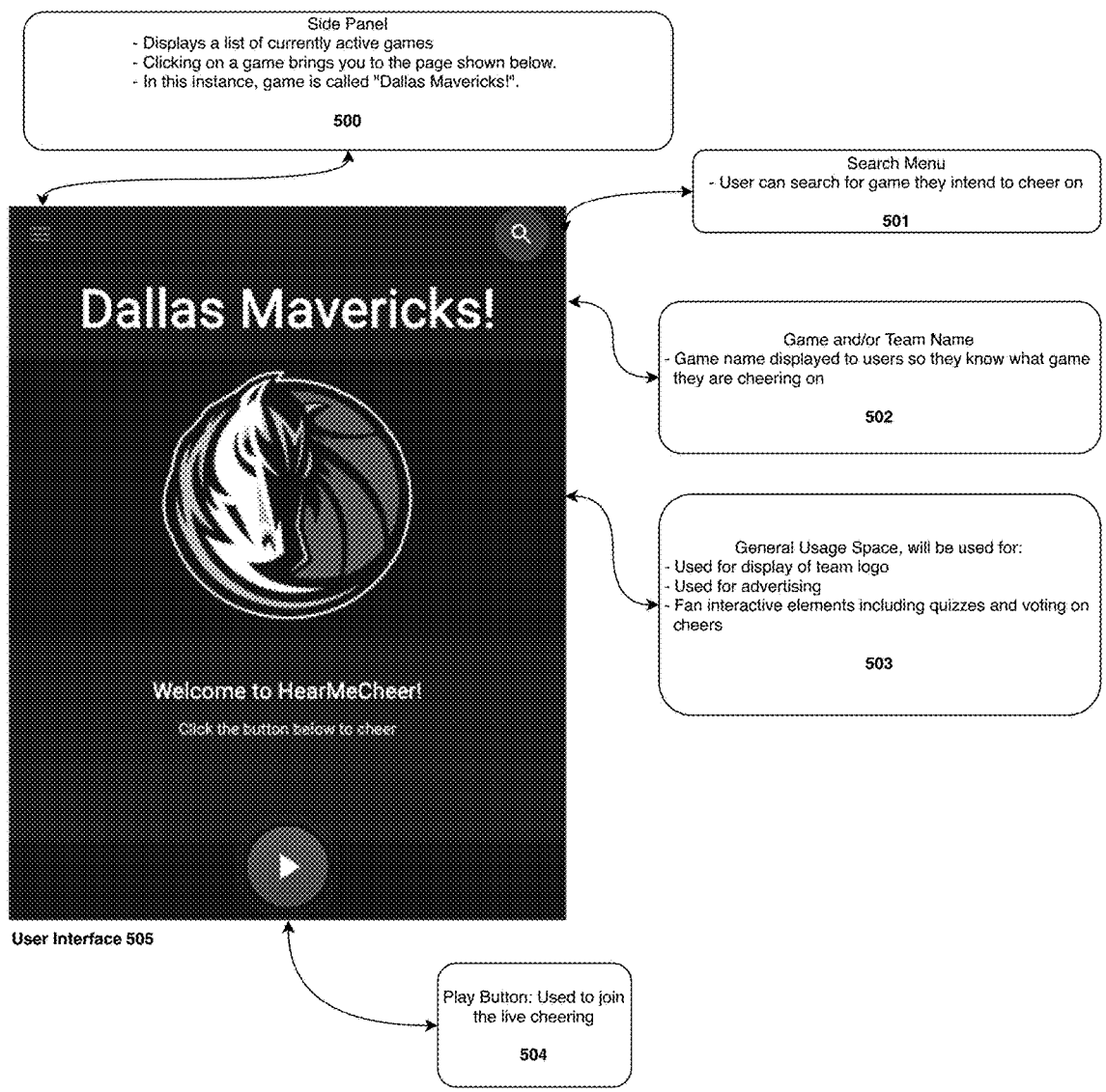
FIG. 5 shows a non-limiting exemplary user interface description.

FIG. 5 shows a non-limiting exemplary user interface description. As shown the user interface may feature a number of graphical elements or the number of functional elements. The user display may, for example, include a side panel 500, which may display a list of currently active games. If the user clicks on a game, they may be brought to the page shown below. In this case, the game is called Dallas Mavericks, but the event or game may have any name. The user can search for their desired game for cheering through a search menu at 501. The game name and team name or other event name, for example, that of the band, or of a festival is preferably displayed at 502 so that the user knows what they would be cheering for and what they would be involved with. Optionally other space may be used for display of a team logo advertising or for other fan interactive elements at 503. Preferably user interface 505 also features a play button 504 so that the user can decide when they wish to join the live cheering and when they wish to have it stop. This may also be used to decide when they wish to hear the cheer sounds and also when they would like to have the sounds no longer being displayed.

Figure 6:
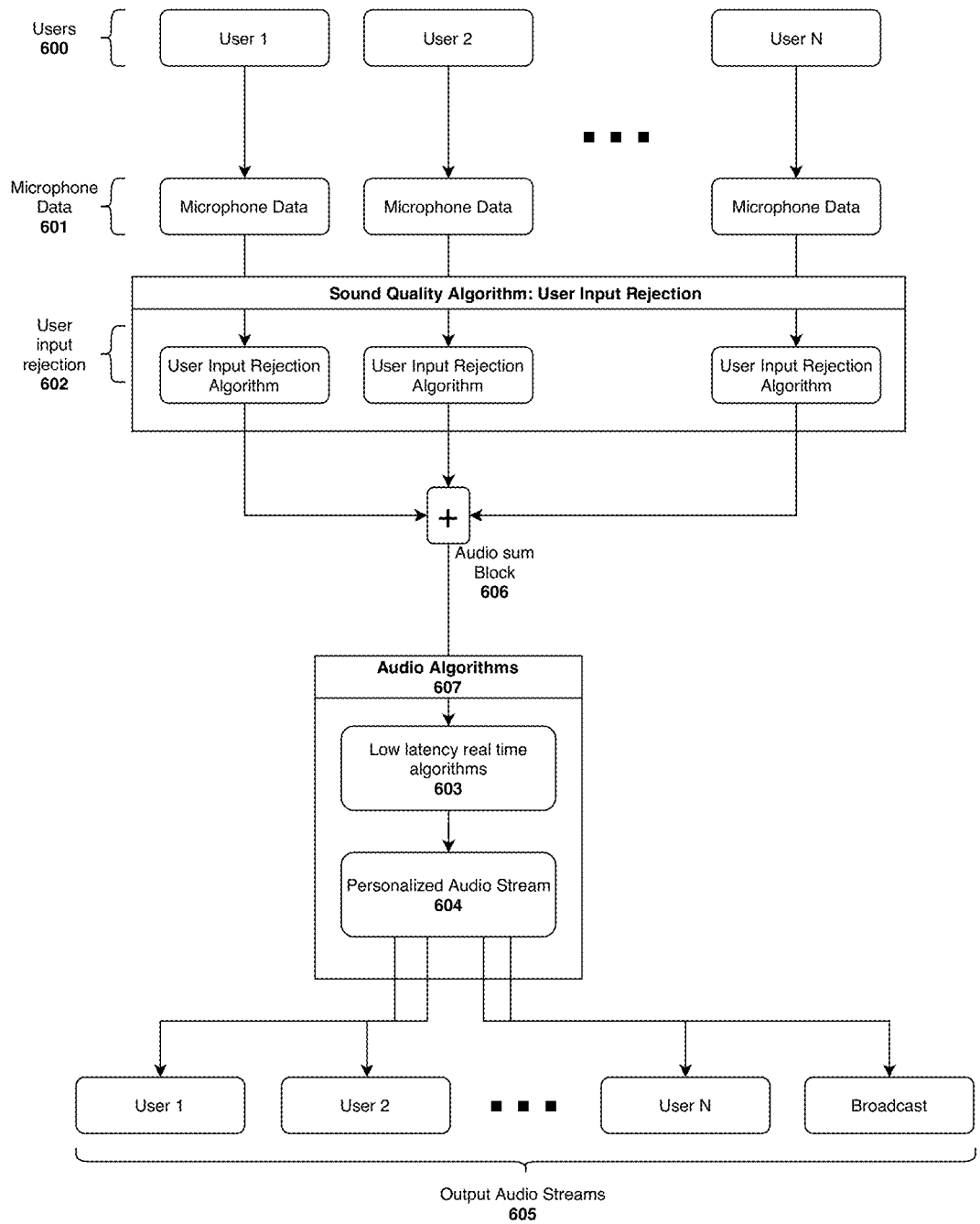
FIG. 6 shows a non-limiting exemplary flow for crowd based sound aggregation.

FIG. 6 shows a non-limiting exemplary flow for crowd based sound aggregation. A plurality of users 600 provide a plurality of output audio data through a plurality of microphones so that it forms microphone data 601. The collected data then is preferably placed through a sound quality algorithm to determine user input rejection for example, for sound quality at 602. Each user output audio, which forms the user input data is then analyzed, and preferably an audio sum block is then performed at 606 to summarize the data. One or more audio algorithms 607 are then applied, including but not limited to low latency real time algorithm 603 in a personalized audio stream 604. This combination is then output to the users are shown as output audio stream 605, which will be displayed to the user device which is not shown.

Figure 7:
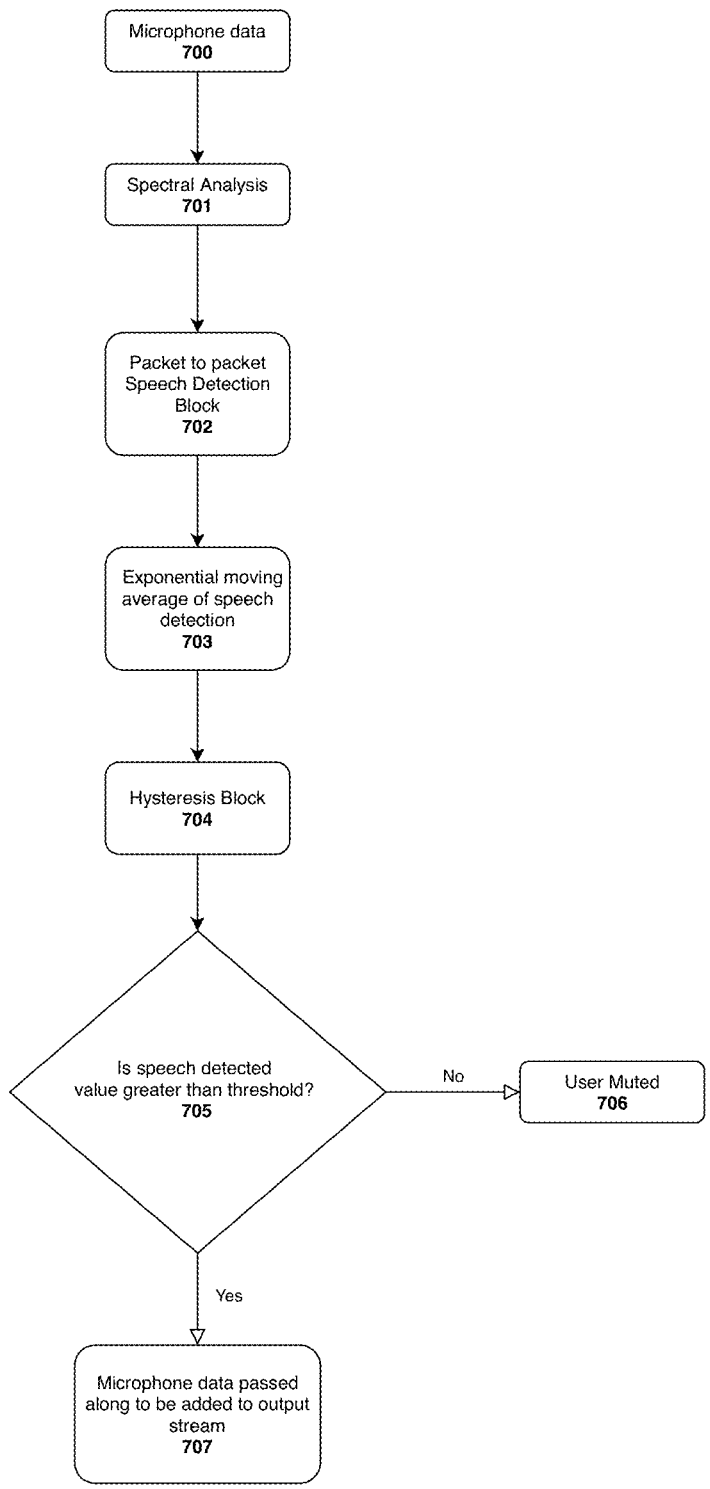
FIG. 7 shows a non-limiting exemplary flow for performing a sound quality upgrade through user input rejection.

FIG. 7 shows a non-limiting exemplary flow for performing a sound quality upgrade through user input rejection. Microphone data is obtained at 700. The microphone data undergoes spectral analysis at 701 for example, to enable speech detection and also optionally to enable sounds which are either too high or too low frequency to be removed. Packet to packet speech detection is then performed at 702 in order to be certain that the user is actually cheering and that the sounds are not random noise or otherwise not related to cheering or having the user make a sound. An exponential moving average of speech detection is performed at 703. This enables the voice detection to occur in such a way that there isn't drop off. So for example, if the user is cheering, perhaps one packet does not include it, but after a number of packets have been detected as including speech, then a number of further packets may also be detected including speech, to avoid choppiness. A hysteresis process is then optionally performed at 704, to smooth the sound produced over time and to incorporate historical data in the analysis. Such a process may be applied for example to avoid repeatedly adding and then ceasing to add audio input from a particular user computational device.

If the speech detected values are greater than a threshold at 705, then the microphone data is passed along to be added to the output stream at 707; otherwise the user may be muted at 706. For example, there may be traffic noises, and other extraneous noises that are not relevant in the microphone data. Preferably this data is removed and the user may then be muted, for at least a period of time.

Figure 8:
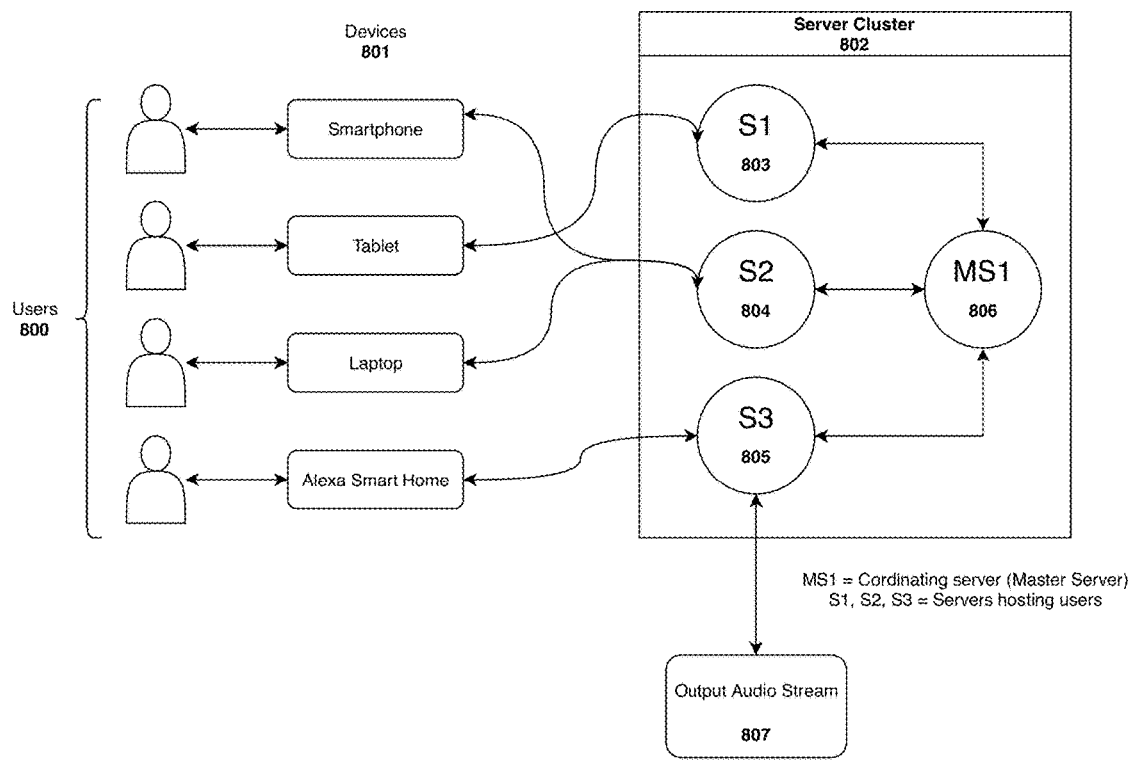
FIG. 8 shows a non-limiting exemplary server cluster architecture implementation.

A server cluster architecture is shown in a non-limiting exemplary implementation in FIG. 8. As shown a plurality of users 800 operate a plurality devices 801, which may be as previously described, and maybe any type of suitable computational device. The output audio data from these users is then input to a server cluster 802. Optionally operating through a plurality of servers shown as S1 803, S2 804, and S3 805. These are preferably controlled by a master coordinating server, MS1 at 806. The server cluster analysis are then used to combine the audio data and output audio stream 807 which may then be output back to devices 801 or may be output for audio broadcast, for example, through a television or through a large gathering or through speakers in another area. Preferably output audio stream 807 is suitable for one-way output as opposed to two-way interactions.

Figure 9:
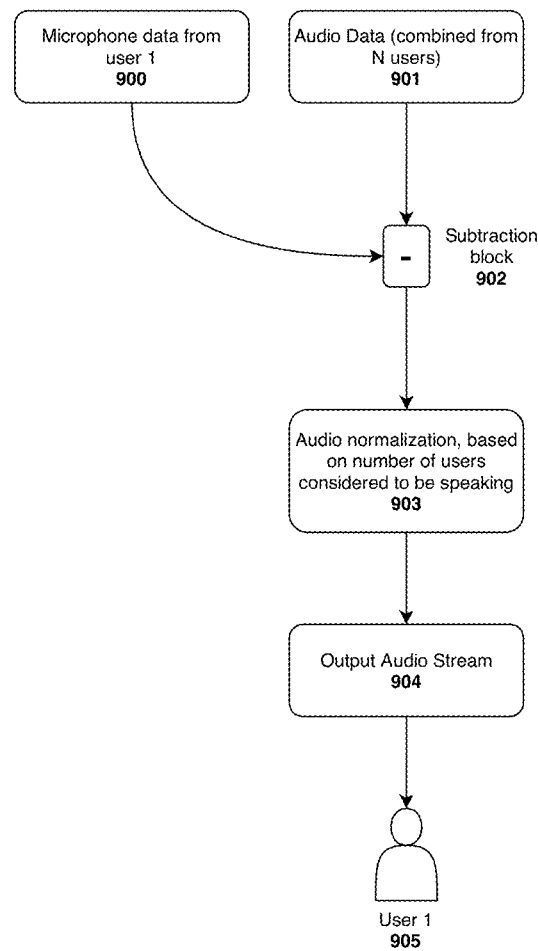
FIG. 9 shows a non-limiting exemplary personal audio feed method.

FIG. 9 shows a non-limiting exemplary personal audio feed method. As shown microphone data from user 1 is obtained at 900. Audio data from N users is obtained at 901. At 902 a subtraction block is applied such that the microphone data from user 1 is de-duplicated from the audio data combined from N users at 901. The application of a subtraction block is to prevent an echo or prevent these users from hearing their own voice but with a time lag. Next audio normalization is performed based on the number of users considered to be speaking at 903. This may optionally also include adding in further audio sounds if in fact insufficient numbers of users are outputting audio data. The output audio stream 904 is then displayed back to the user 905 through their device, not shown.

Figure 10:
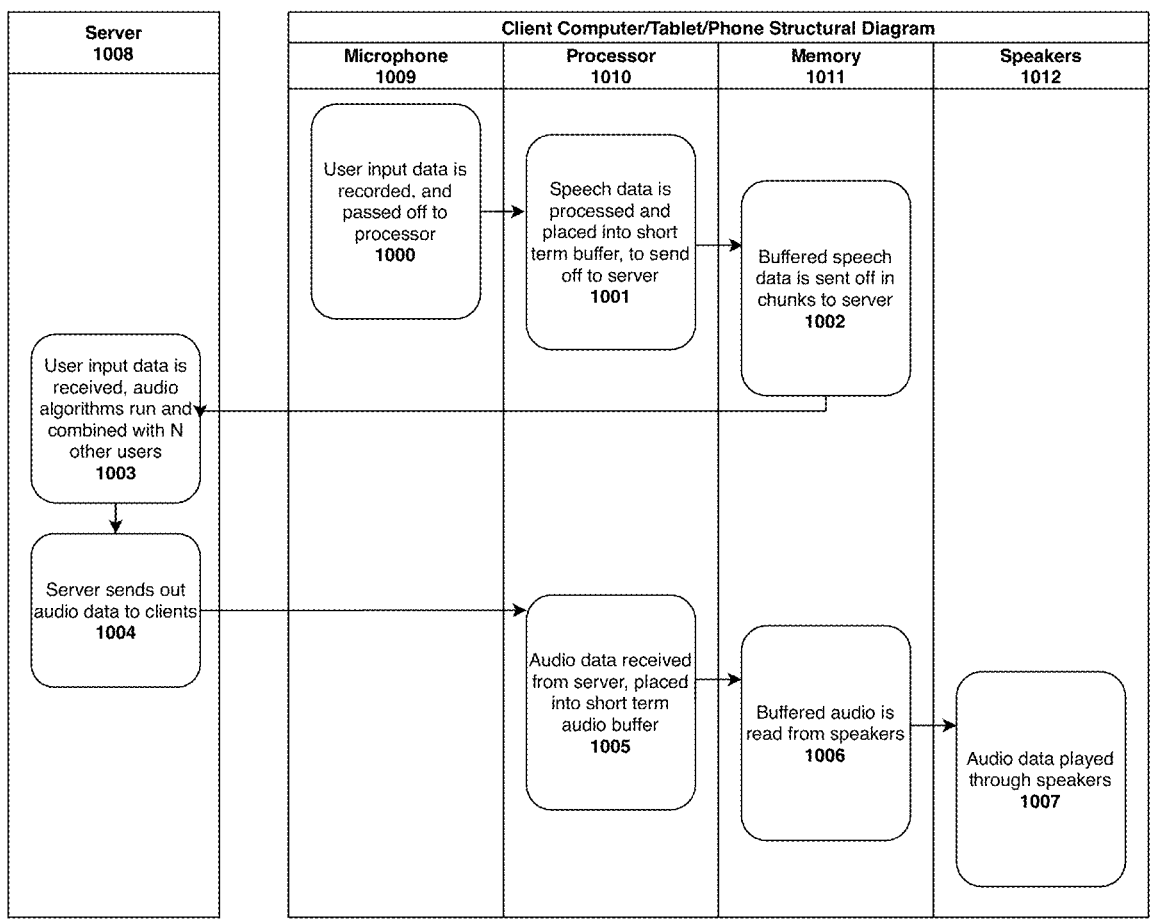
FIG. 10 shows a non-limiting exemplary client sequence diagram again showing the interactions between a user device and the servers for both input and output audio data.

FIG. 10 shows a non-limiting exemplary client sequence diagram again showing the interactions between a user device and the servers for both input and output audio data. A client computational device preferably features a microphone 1009, a processor 1010, a memory 1011 and speakers 1012. User output audio data forms the input to server 1008 which then outputs an audio stream for display by speakers 1012. Starting with microphone 1009, the user input data is recorded and passed off to the processor at a stage 1000. This is then handed off to processor 1010 for processing speech data and placing into a short term buffer at 1001. After that, the buffered speech is sent off in chunks at server 1002 preferably to store it at 1011 before being sent. The buffered speech chunks are preferably 960 samples, corresponding in total to 20 ms of audio data per buffered chunk.

Next, the buffered speech chunks are received by server 1008, and then audio algorithms are run and combined with N other users at 1003. The server sends out the audio data to clients at stage 1004. This audio data is then received by the client computational device and specifically by processor 1010. Audio data received from the servers placed into a short term audio buffer 1005 the buffered audios read from the speakers at 1006 from memory 1011. The audio data is then played through the speakers at stage 1007.

Figure 11:
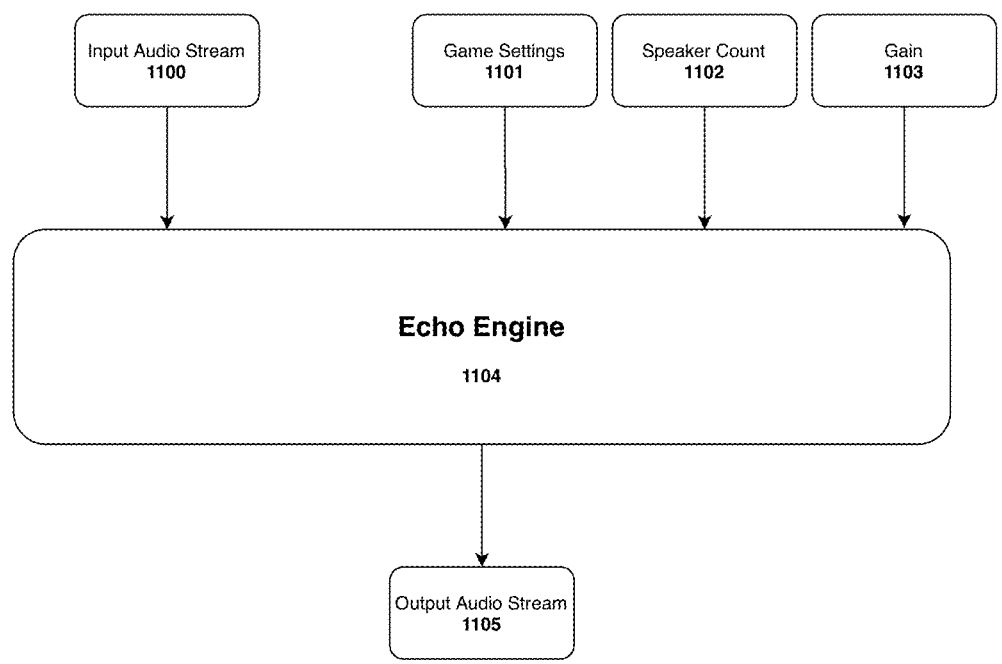
FIG. 11 shows an exemplary, non-limiting system for handling echo.

FIG. 11 shows an exemplary, non-limiting system for handling echo. An audio based echo system may be used to reduce echo or alternatively to add echo to provide the sound of a plurality of users cheering in a large stadium or other open area, or alternatively large closed area. As shown, the system features an input audio stream 1100, a plurality of game settings 1101, a speaker count 1102 and a gain 1103. Non-limiting examples of game settings 1101 include a maximum number of users (clients or apps on the respective user devices), baseline volume, and an echo threshold which may be set as a multiple of a particular number, to determine when to apply echo. Input audio stream 1100 and gain 1103 are applied within an echo engine 1104, to add or reduce echo in order to create the desired sound experience. Speaker count 1102 may relate to the number of input user audio streams.

For example, speaker count 1102 and game settings 1101 may be applied to create a sound that is typical of a particular stadium, arena, or other open or closed area. Echo may be applied for example by repeating existing sounds and noises from fans, at varying volume levels, number of echoes and so forth, to preferably create a more realistic output sound. By "realistic" it is meant a sound that more closely reproduces the sound that would have normally been expected to be output were the event to have been held with the expected number of attendees at the physical location for the event.

After application of a correct amount of echo, whether increased or decreased, an output audio stream 1105 is provided by echo engine 1104.

Figure 12:
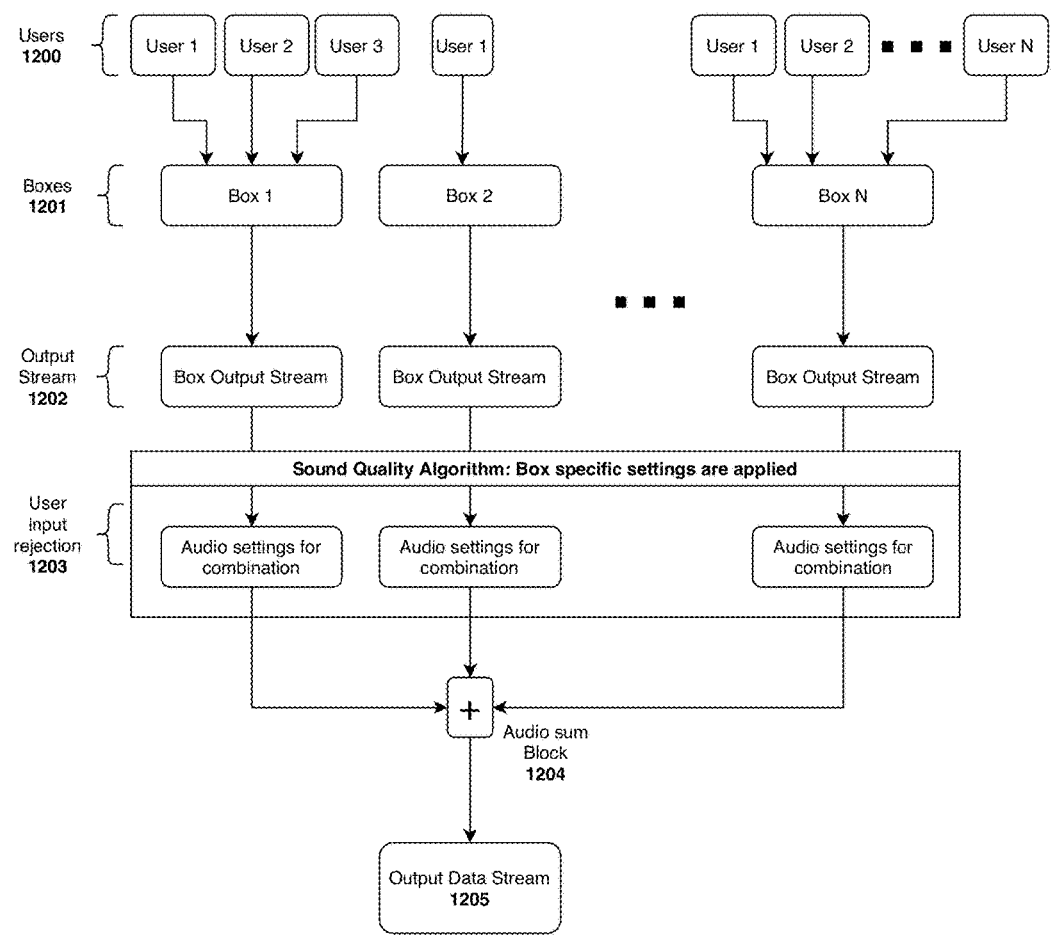
FIG. 12 shows an exemplary, non-limiting flow for group sound from a plurality of users into boxes, and applying particular filters and/or settings to sound according to each grouped box.

FIG. 12 shows an exemplary, non-limiting flow for group sound from a plurality of users into boxes, and applying particular filters and/or settings to sound according to each grouped box. As shown in the flow, sound from a plurality of user computational devices 1200 is grouped into a plurality of box designations 1201. Some boxes may have sound from only one user computational device 1200, while others may have sound from a plurality of such user computational devices 1200. Sorting user computational devices 1200 into box designations 1201 may be performed for example according to sound quality, frequency of sound, consistency of sound production and/or quality, and so forth. Optionally, additionally or alternatively, box designations 1201 may relate to a shared sound experience with a group of users, who could then hear each other more clearly (as though they were at the same or similar location at a space where an event is occurring) while still also hearing the background sounds. Box designations 1201 may represent multiple computational algorithms operated by a plurality of different server processes and/or computational devices, for example.

Next, a plurality of output streams 1202 are output according to the settings, parameters, filters and so forth for box designations 1201. Optionally as part of the sound quality process, at 1203, user input rejection is performed. Preferably user input rejection is performed according to the previously described box designations 1201, for example according to the settings or parameters, such that each output stream 1202 is processed according to the settings, parameters and so forth for its respective box designation 1201. For example, at this stage, audio settings may be applied for combining sounds within each output stream 1202 and/or between output streams 1202. Then preferably all sounds are combined through an audio sound block 1204, after which an output sound stream 1205 is preferably output.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for producing combined audio data associated with an event, the system comprising a user computational device, comprising a user interface and an audio intake device operated by said user computational device; a server comprising an audio data combining engine; an audio display; and a computer network for connecting between said user computational device, said server and said audio display; wherein said audio data combining engine of said server combines a plurality of audio data sources, including audio data from said audio intake device from said user computational device, in real time during the event, to form the combined audio data; and transmits the combined audio data to said audio display for audio playback in real time; wherein said user computational device is selected from the group consisting of a smartphone, tablet, an Alexa or other smart speaker, a smart home appliance, user computer, laptop, a phablet and another suitable computational device; wherein said audio playback in real time occurs with a delay of at least 100 ms; and further comprising a plurality of user computational devices, wherein audio data from a plurality of audio intake devices operated by said plurality of user computational devices is combined by said audio data combining engine, and wherein at least one audio data from said plurality of user computational devices is received with a time delay, wherein said combining by said audio data combining engine is adjusted according to said time delay.

2. The system of claim 1, wherein said audio intake device comprises a microphone.

3. The system of claim 2, wherein said server comprises a processor and a memory, wherein said memory stores a plurality of instructions for execution by said processor, said instructions comprising instructions for:
receiving said microphone data from said user computational device;
spectrally analyzing said microphone data;
performing packet to packet speech detection of said microphone data;
if speech is detected, determining whether a value of said microphone data is over a threshold;
if said value is over said threshold, combining said microphone data with microphone data from a plurality of other user computational devices to form said combined audio data; and
transmitting combined audio data to said user computational device.

4. The system of claim 3, wherein said instructions stored in said memory of said server further comprise instructions for performing a hysteresis process on microphone data where speech is detected before determining where said value is over said threshold.

5. The system of claim 4, wherein if said value is not over said threshold, said microphone data from said user computational device is muted.

6. The system of claim 1, wherein audio quality from each of said plurality of audio intake devices is adjusted to form said combined audio data.

7. The system of claim 6, wherein said adjustment of audio quality further comprises adjusting echo by said audio data combining engine to create said combined audio data.

8. The system of claim 1, wherein the event is an outdoor event and said combined audio data is combined to form a realistic audio stream for playback.

9. The system of claim 8, wherein said audio display is present at said outdoor event.

10. The system of claim 9, wherein said audio display is in communication with or is a part of said user computational device.

11. The system of claim 1, wherein if said time delay is larger than a preset threshold, said audio data from said user computational device is rejected by said audio data combining engine.

12. The system of claim 11, wherein said preset threshold is 300 ms.

* * * * *